United States Patent [19]
Dellert et al.

[11] Patent Number: 6,154,755
[45] Date of Patent: *Nov. 28, 2000

[54] INDEX IMAGING SYSTEM

[75] Inventors: David William Dellert, Fairport; Stephen L Shaffer, Penfield, both of N.Y.; Maja Aniela Gruszynski, Weston, Mass.; Gregory Richard Bryniarski, Rochester; Brian Neil Westrich, Scottsville, both of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/688,899

[22] Filed: Jul. 31, 1996

[51] Int. Cl.[7] .................................................. G06F 17/30
[52] U.S. Cl. ........................... 707/526; 707/10; 707/104; 707/501; 358/449
[58] Field of Search .............................. 707/10, 104, 501, 707/502, 526, 513, 528, 527, 911; 358/302, 448, 449, 487

[56] References Cited

U.S. PATENT DOCUMENTS

| | | | |
|---|---|---|---|
| 4,966,285 | 10/1990 | Otake et al. | 206/455 |
| 5,184,227 | 2/1993 | Foley | 358/302 |
| 5,493,677 | 2/1996 | Balogh et al. | 707/104 |
| 5,608,542 | 3/1997 | Krahe et al. | 358/449 |
| 5,617,119 | 4/1997 | Briggs et al. | 707/100 |
| 5,760,916 | 6/1998 | Dellert et al. | 358/408 |
| 5,761,686 | 6/1998 | Bloomberg | 707/529 |
| 5,765,176 | 6/1998 | Bloomberg | 707/514 |
| 5,926,288 | 7/1999 | Dellert et al. | 358/487 |
| 5,949,551 | 9/1999 | Miller et al. | 358/408 |
| 6,017,157 | 1/2000 | Garfinkle et al. | 396/639 |

OTHER PUBLICATIONS

Cohen, Harvey A., "Access and Retrieval From Image Database Using Image Thumbnails", International Symposium on Signal Processing and its Applications, ISSPA, Gold Coast, Australia, Aug. 25–30, 1996. pp 427–428.

McCandless, M., "Digital photography: a farewell to cheese", IEEE Intelligent Systems, Mar.–Apr. 1998, vol. 13, Issue: 2, pp 16–17.

Cohen, Harvey A., "Access and Retrieval from Image Database Using Image Thumbnails", Fourth International Symposium on Signal Processing and Its Applications, 1996, ISSPA '96, Aug. 25–30, 1996, vol. 1. pp. 427–428.

Prabhakar, Sunil et al., "Browsing And Placement of Multiresolution Images on Secondary Storage", IEEE International Conference on Multimedia Computing and Systems' 97., Jun. 3–6, 1997, pp 636–637.

Yang, Zijun et al., "A Semantic Classification and Composite Indexing Approach to Tobust Image Retrieval", Proceedings of the 1999 International Conference on Image Processings, 1999., ICIP 99, Oct. 24–28, 1999, pp 134–138 vol. 1.

Zhu, Wei et al., "Image Organization and Retrieval Using A Flexible Shape Model", Proceedings of the 1998 IEEE International Workshop on Content–Based Access of Image and Video Database, 1998, Jan. 3, 1998, pp 31–40 Aug. 1996.

*Primary Examiner*—Hosain T. Alam
*Assistant Examiner*—Shahid Alam
*Attorney, Agent, or Firm*—James D. Leimbach

[57] ABSTRACT

An index imaging system includes: a scanner for scanning a plurality of photographic images to produce a corresponding plurality of digital images; a computer connected to the scanner for receiving the digital images and generating a corresponding plurality of thumbnail digital images and containing index imaging software for writing an application program for manipulating the digital images; a printer connected to the computer for receiving the thumbnail digital images and producing an index print; and a floppy disc writer connected to the computer for recording the thumbnail digital images and the application program on a floppy disc. Computer program products carrying thumbnail digital images and optionally particular application programs, are also provided.

23 Claims, 10 Drawing Sheets

INDEX IMAGING SYSTEM

The disclosure in the appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to the field of photography, and in particular to digital images produced from photographic images. More specifically, the invention relates to a method for storing the digital images on a floppy disc and producing an index print of the images stored on the floppy disc.

BACKGROUND OF THE INVENTION

Recently, services are being offered whereby images on photographic film are scanned and relatively low resolution digital versions of the images are recorded on a floppy disc for use in a personal computer. In one such service, Floppy Shots™ offered by Floppy Shots Ltd., Vienna Va., special viewing software is recorded on the disc so that the images may be viewed on the display of a personal computer with the click of a button. In another such service, Pictures on Disk™ offered by Seattle Filmworks, a free software package PhotoWorks™ is provided separately for viewing the images on the floppy disc.

After several discs with images are acquired, a problem arises in knowing what images are on which disc without the need for displaying all of the images on the personal computer. It would be desirable to provide a means by which the images can be readily visually ascertained. It would further be desirable if such means allows the images present to be visually ascertained on a computer display in a rapid manner.

SUMMARY OF THE INVENTION

The present invention is directed to overcoming one or more of the problems set forth above. Briefly summarized, according to one aspect of the present invention, an index imaging system includes: a scanner for scanning a plurality of photographic images to produce a corresponding plurality of digital images; a computer connected to the scanner for receiving the digital images and generating a corresponding plurality of thumbnail digital images and containing index imaging software for writing an application program for manipulating the digital images; a printer connected to the computer for receiving the thumbnail digital images and producing an index print; and a floppy disc writer connected to the computer for recording the thumbnail digital images and the application program on a floppy disc. According to one aspect of the invention, the application program supplied on the disc generates an index print containing the images on the disc. According to another aspect of the invention, the floppy disc is provided with a label bearing an index print of the images on the disc.

The present invention not only allows an individual to ascertain what pictures are on which disk by reference to an index display, which may be a hard copy display or a display on a monitor. Furthermore, the monitor index display can be rapidly generated from the saved thumbnail images rather than waiting for software to generate thumbnail images from higher resolution image files on the disc. Additionally, the present invention in providing a means for updating the thumbnail digital images in accordance with manipulations (such as crop and/or rotate) permformed on the higher resolution images, allows a user to rapidly view the index display on the monitor illustrating the images after those manipulations.

BRIEF DESCRIPTION OF THE DRAWINGS

FIGS. 4 to 8B are flowcharts illustrating the process executed by some of the application programs in the preferred embodiment of the present invention.

DETAILED DESCRIPTION OF THE INVENTION

In the present application, a "high resolution" (sometimes referenced as "higher resolution") and thumbnail images are referred to. These are relative terms, in the sense that the high resolution image will be of higher resolution (that is, have more pixels in the image) than the thumbnail image. Typically, the high resolution image will have a resolution of at least 400×400 pixels, and will preferably be of a "base resolution" (that is, 512×768 pixels), while the thumbnail digial images will typically be less than 200×200 pixels (preferably about 100×100 pixels).

Figure 1:
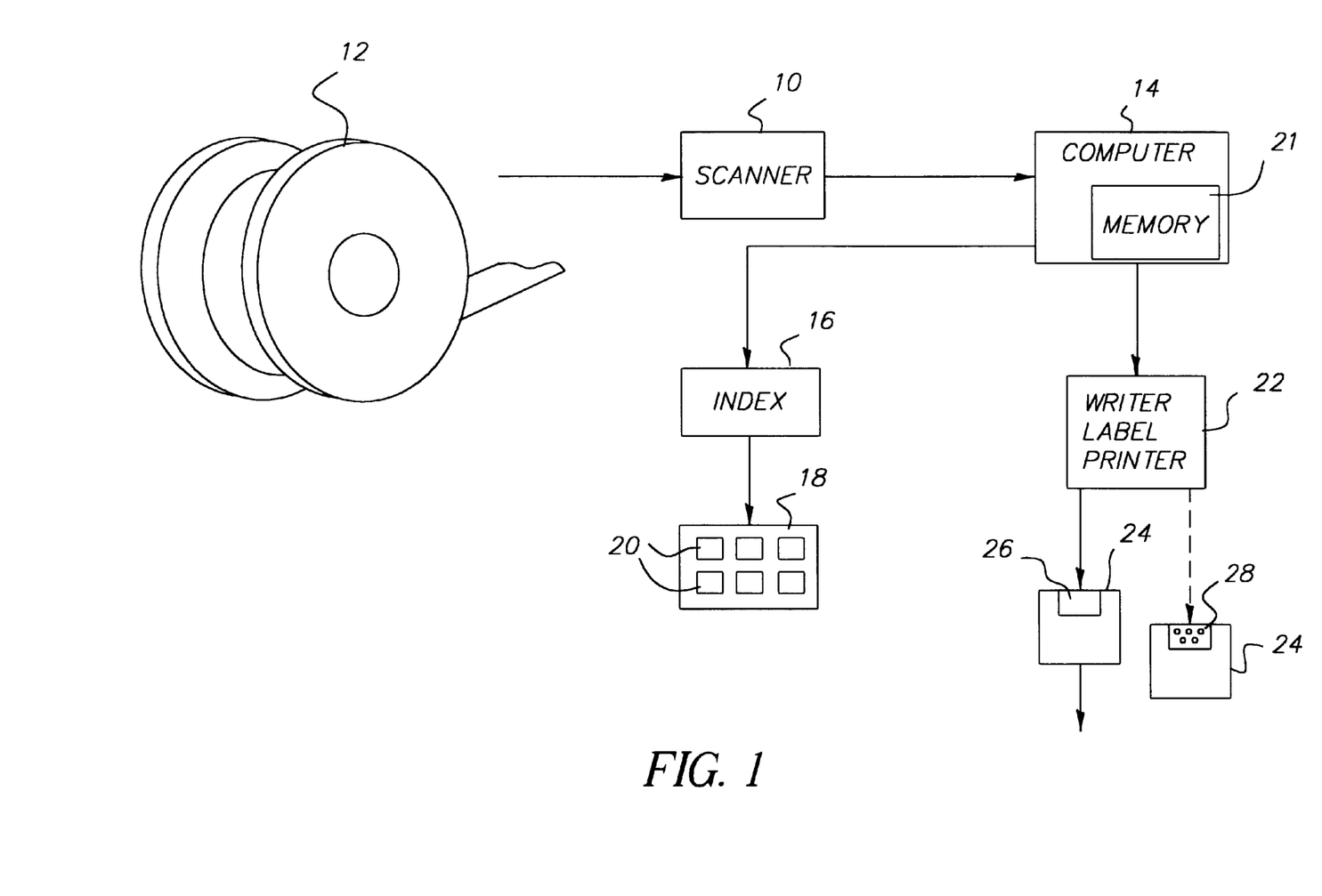
FIG. 1 is a schematic diagram showing an index imaging system according to the present invention.

Referring to FIG. 1, a floppy disc index imaging system according to the present invention includes a scanner 10 for scanning images on developed photographic film 12. In the preferred embodiment of the invention, the developed film 12 comprises a spliced together roll of individual 35 mm film strips having splice bar-codes between orders as is well known in the photofinishing art. Images on the film 12 are scanned to produce digital images, and the splice bar codes are read and are supplied to a computer 14. The computer 14 is programmed to size the digital images from an individual film strip into "thumbnail" index images of 100×100 pixels, and format the images into an array. The array is sent to an index printer 16 which produces an index print 18 having an array of index images 20. In a preferred embodiment of the invention, the scanner 10 and index printer 16 are components of a Kodak Digital Index Print Station available from Eastman Kodak Company, Rochester, N.Y.

In addition to the "thumbnail" index images, the computer 14 also formats the digital images from scanner 10 into higher resolution images of CRT compatible resolution (for example, a "base resolution" of 512×768 pixels). A memory 21 associated with the computer 14 contains application programs, as described below, for manipulating digital images. Computer 14 sends the digital images and the application programs to a floppy disc writer and label printer 22 that writes the digital images and the application programs onto a floppy disc 24, and prints a label 26 and applies it to the floppy disc 24.

In an alternative embodiment of the present invention, the computer 14 also sends the "thumbnail" images, appropriately formatted to the floppy disc writer and label printer 22, which prints an index print of the images on the label, and applies the label to the floppy disc, to produce a floppy disc 24 with an index print label 28.

In the presently preferred system, the floppy disc writer and label printer 22 is any commercially available writer and printer. The floppy discs are High Density Double sided discs (1.44 Mb formatted dos). The floppy discs are written so that they are readable in Widows 95, Windows 3.1, and Macintosh (7.0 or greater) operating systems. Each of the image files written on the disc is in JPEG format and the color space of the files corresponds to CCIR 601, YCbCr. The image files are compressed using JPEG V1.0 compression and the computer 14 varies the compression ratio so that up to 28 images can be fitted on a single disc. Accordingly, a customer order (one roll of film) may require more than one disc. In this case, the application programs are included on each disc of the order.

Each image on a disc is given a default name using ISO 9660 compliant file names according to the following protocol. If a frame number exists in DXN format on the film, images are named IMG001.JPG, IMG003A.JPG, IMG005A.JPG, IMG007.JPG, etc. If a frame number in DXN format does not exist on the film, images are named IMG001.JPG, IMG002.JPG, IMG003.JPG, IMG.004.JPG, etc. Image files for orders for which there is no DXN information on the film and that include more than one disc (i.e. more than 28 images) are numbered such that the image numbering is sequential from one floppy to the next. The floppy disc label contains an order number obtained from the splice bar-code; an indication of the number of images on the floppy disc 24; an indication of the number of floppy discs in the order (e.g. 1 of 2, 2 of 2, etc.); and the time and date when the order was scanned along with the serial number of the system producing the floppy disc.

The application programs contained on the floppy disc are less than or equal to 500 KEytes in size and follow the 8.3 format used in DOS systems. The application programs may include, for example, a graphic user interface; a program for generating an index print such as the index print 18 on a personal computer; a program for creating image categories and classifying images into the categories such as "Vacation '95", "Wedding", "Kids", etc. and saving the digital images in a virtual photo album on a memory associated with the personal computer; a program for renaming images from the default title assigned by computer 14; programs for renaming or deleting the image categories; a program for printing a selected image in a designated size on a printer associated with the personal computer; a program to rotate the images in the index print by 90 degrees; image editing programs to crop, rotate, and copy a selected image to a clipboard; a program for saving an edited image in the virtual photo album; a program for exporting an edited image into a user-specified file format such as a Bitmap file (*.BMP), GIF file (*.GIF), JPEG file (*.JPEG), PICT file (*.PCT), PCX file (*.PCX), TIFF file (*.TIF), DCX file (*.DCX), Photoshop file (*.PSD), Encapsulated Postscript file (*.EPS), TARGA file (*.TGA), WMF file (*.WMF), or WPG file (*.WPG); a program to print an edited image on a printer associated with the personal computer; a program for showing the images one at a time on a display associated with the personal computer to produce a virtual slide show; or a program for changing the color of the background of the index print or the surround of the images in the virtual slide show.

Figure 2:
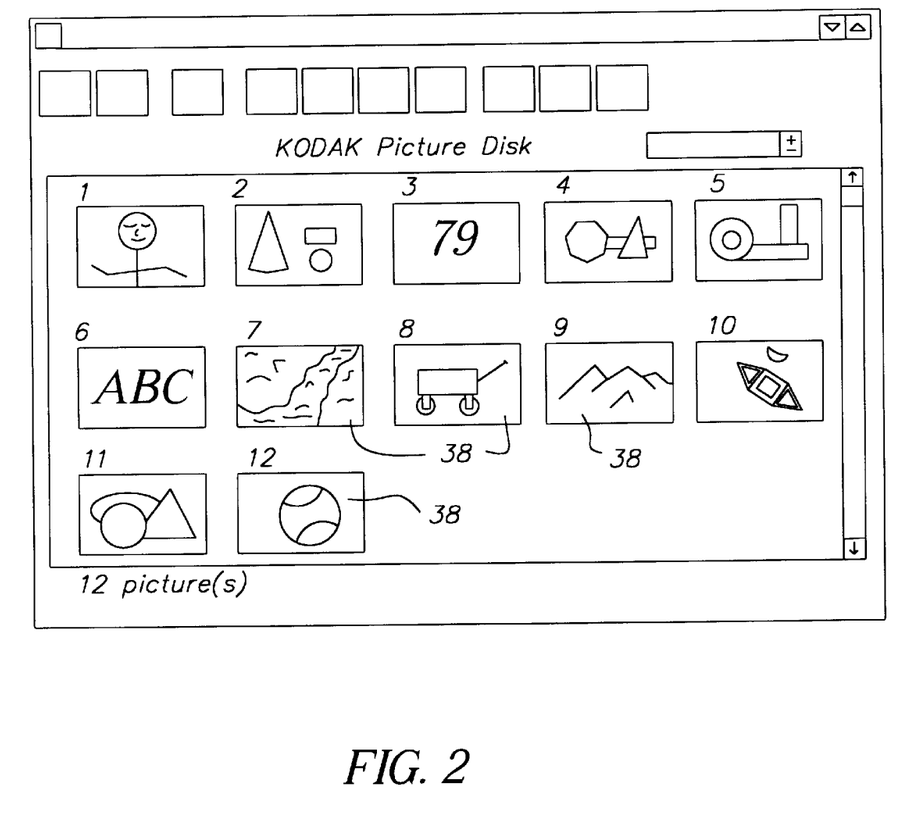
FIGS. 2 and 3 show graphic user interfaces employed in an embodiment of the present invention.

The application programs are accessed by a user via the graphic user interface that is displayed on a monitor of the computer when the floppy disc is read on the personal computer. FIG. 2 is a first view of the user interface referenced as the "Images View". In the Images View, the thumbnail images 38 corresponding to the higher resolution images saved on disc 24, can be viewed. As illustrated in FIG. 2, th Images View allows the user to perform through the application programs, the following tasks: view the contents of the floppy disc 24 as an index display on the monitor; copy selected images form the floppy disc to a virtual image album in a memory (such as a hard drive) associated with the personal computer; create/rename/delete image categories with the image album; view the contents of the image album by various categories; rename images in the album and move between different categories; sort images by name and date in descending/ascending order; delete an image from the image album; export an image to a file; print a selected image or an index print of all the images on a printer attached to the personal computer; and get on-line help.

Figure 3:
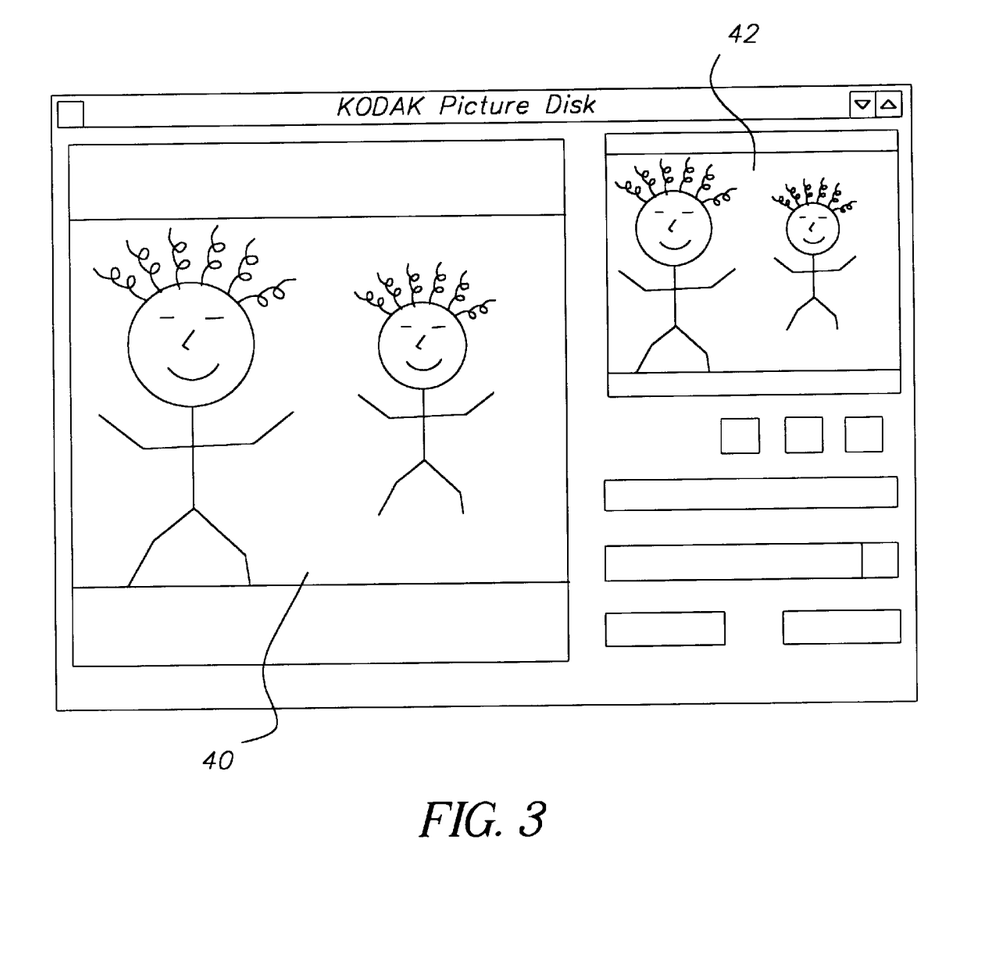

A second interface screen as shown in FIG. 3 is called the "Image Edit View" and allows the user to crop/scale a selected image; save the modified image to the album; export the modified image to a file; print the modified image; or get on-line help.

The execution of some of the the application programs saved on floppy disc 24 is provided below.

Open Picture Disk

Figure 4:
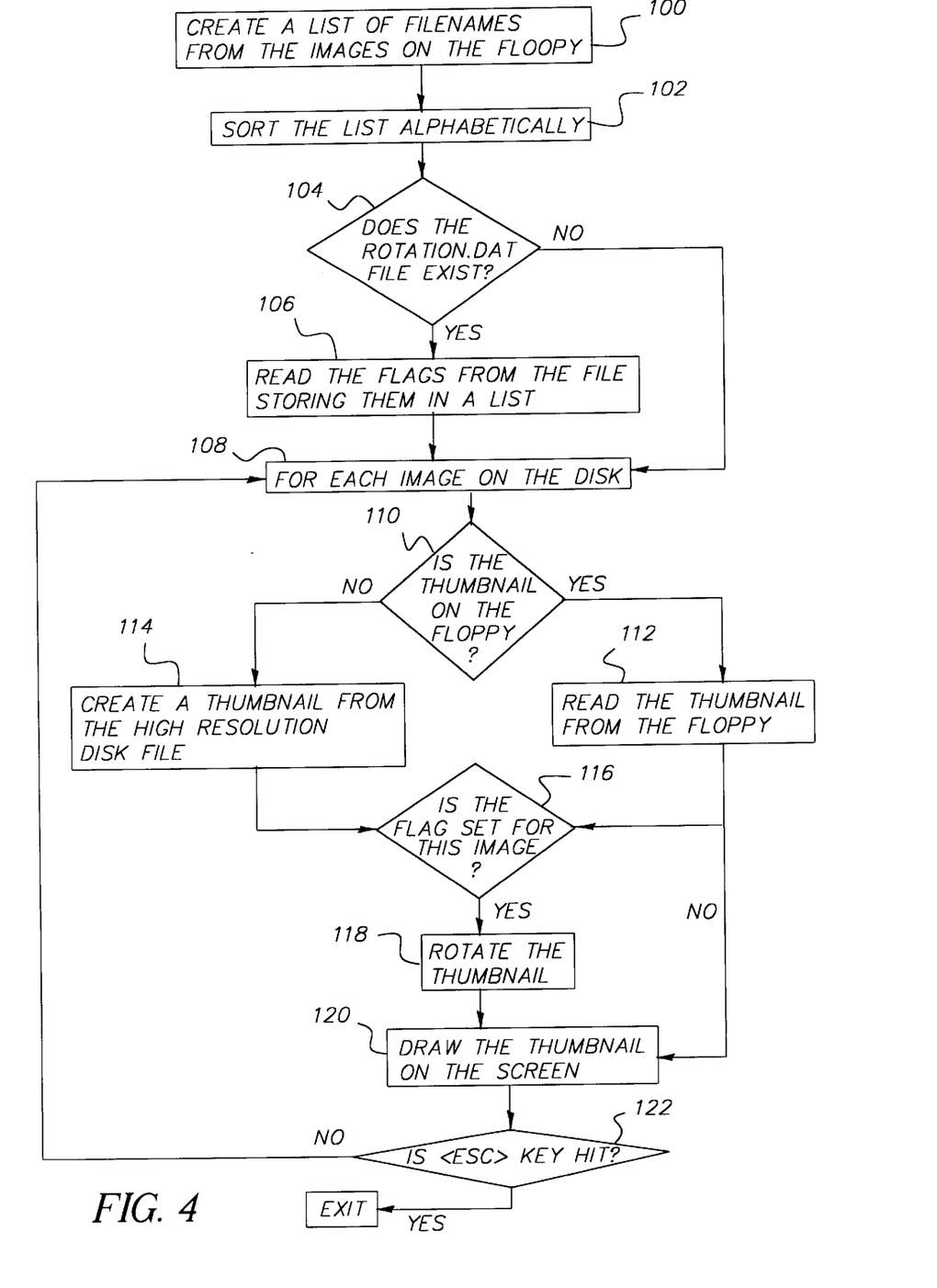

The flowchart for this process is shown in FIG. 4. When a user wishes to look at the images saved on floppy disc 24, an Open Picture Disk command is selected from the "File" menu of a Windows based operating system. The user is prompted to "Insert the Kodak Picture Disk in Drive A:". A list of filenames with the ".JPG" extension is created 100 from the images on the floppy disk. The list is sorted 102 alphabetically. If a file "ROTATION.DAT" exists 104 on the floppy, this indicates a user has previously rotated images on this floppy disk. This file contains a flag for each image on the disk indicating the rotation value of the image. The flags are read and stored 106 in a rotation list. For each of the higher resolution digital images on the disk, the following operations are performed: If the thumbnail digital image (sometimes referenced herein simply as a "thumbnail") corresponding to the higher resolution digital image is on the floppy disk, it is read 112. Otherwise, a thumbnail digital image is created 114 from the higher resolution digital image on the disk. The thumbnail is resized to 96×96 pixels. If the thumbnail needs to be rotated according to the rotation flag, then it is rotated 118. The thumbnail is then drawn 120 on the screen. A check is made 122 to see if the user canceled the operation by hitting the escape key. If so the above loop is exited.

Rotate Thumbnails

Figure 5:
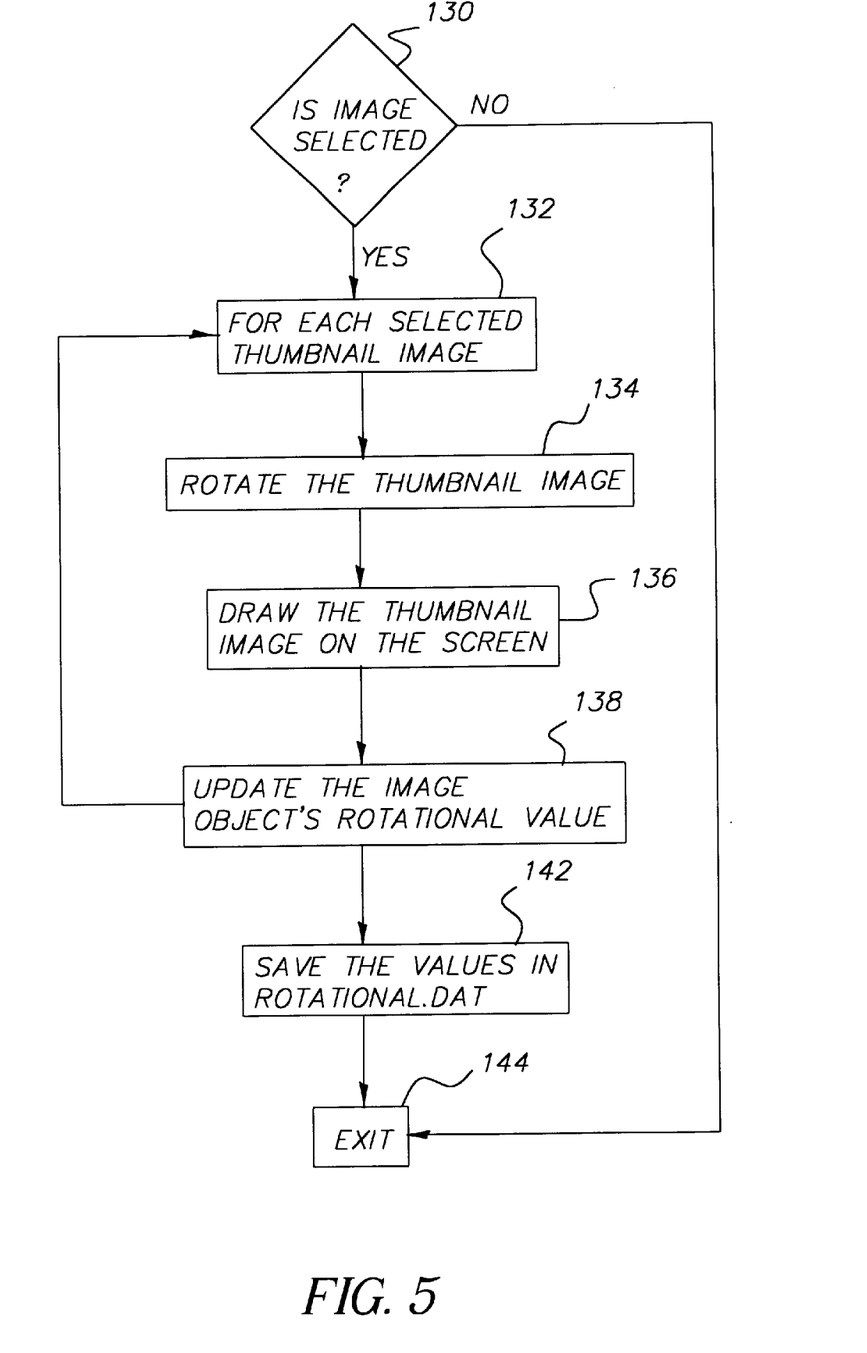
Figure 6:
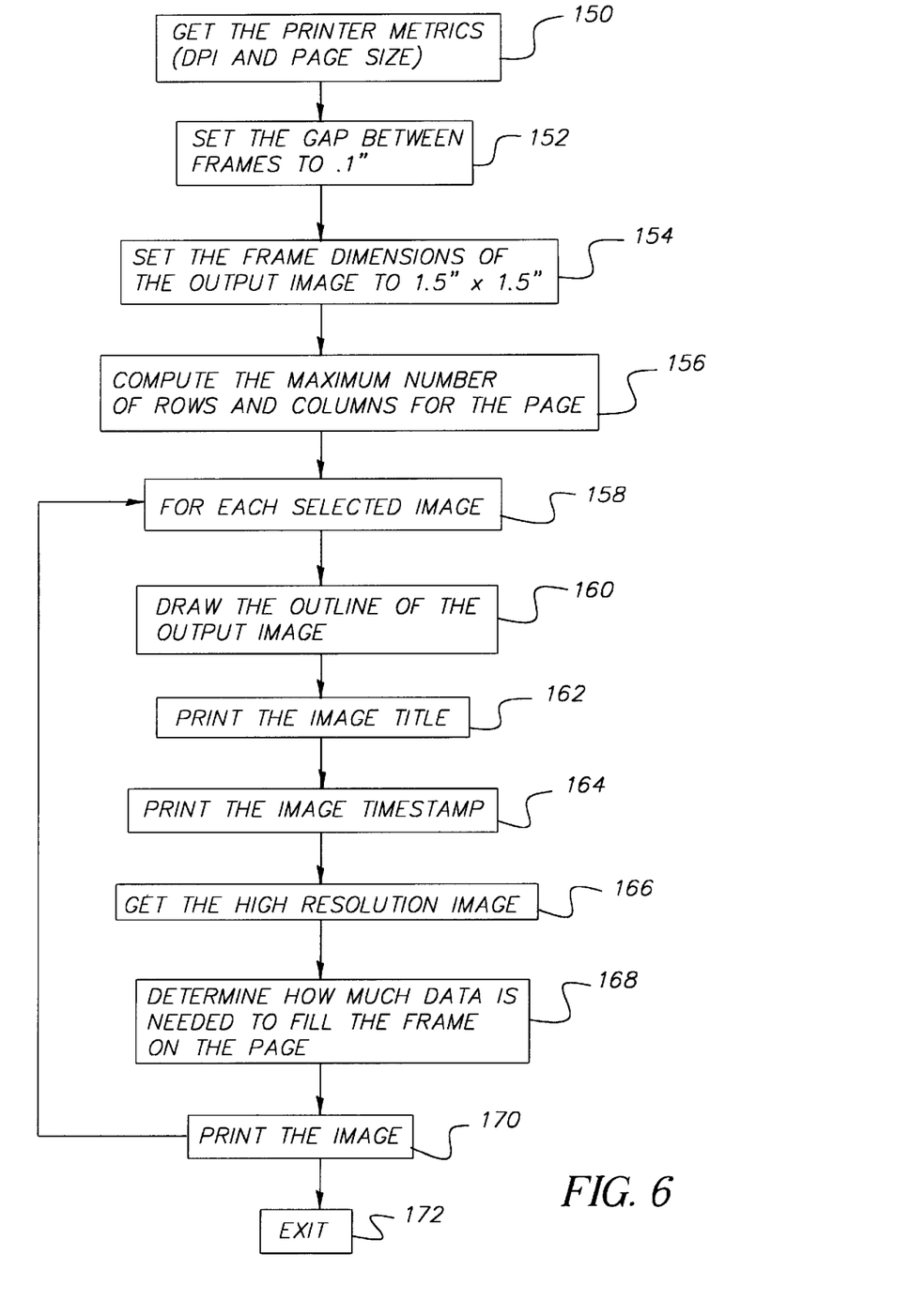

The flowchart relating to rotation of a thumbnail is shown in FIG. 5. To rotate a thumbnail when in the Images View screen of FIG. 2, a user selects an image 130 or multiple images and click the "Rotate Picture" command from the Edit menu. An image must be selected for the "Rotate Picture" command to be enabled. The user is prompted for a specific rotation value −90 degrees left, 180 degrees or 90 degrees right. For each selected image 132, the following operations are performed: Rotate 134 the thumbnail in accordance with the user specified rotation. Draw 134 the rotated thumbnail to the screen. Update 138 the image object's rotation value (an "image object" is a file saved on the disc, which contains data specifying for the image: title; timestamp; category; pointer to high resolution image; file name; thumbnail digital image; data on the source of the image; and pointer to ROTATION.DAT file). Save the new values in the "ROTATION.DAT" file 142.

It will be appreciated that the ROTATION.DAT file, in carrying a pointer to the thumbnail image and the high resolution image, is considered "associated" with those images. It is contemplated that the saved thumbnail image could be directly altered in accordance with the manipulation (in this case, rotation) performed on the thumbnail image. However, saving the rotation performed on the thumbnail image in the associated ROTATION.DAT file, allows rapid rotation of the thumbnail in a computer's random access memory (RAM) without the time required to save a new rotated complete thumbnail image each time a rotation is performed.

Organizing Pictures: Folder and Albums

The user can save copies of selected pictures from the floppy disk to the hard disk. A category can be assigned by the user to each image so the user can organize his pictures. An IMGALBUM folder is created and within it the THUMB and IMAGES folders ("folders" sometimes being referenced herein as "directories"). The IMGALBUM folder contains the Albun.IDX file. This file stores the list of categories and the list of thumbnails of "organized" pictures. The Images folder contains the High resolution JPEG image. The THUMB folder contains the low resolution DIB file.

Figures 7, 7A:
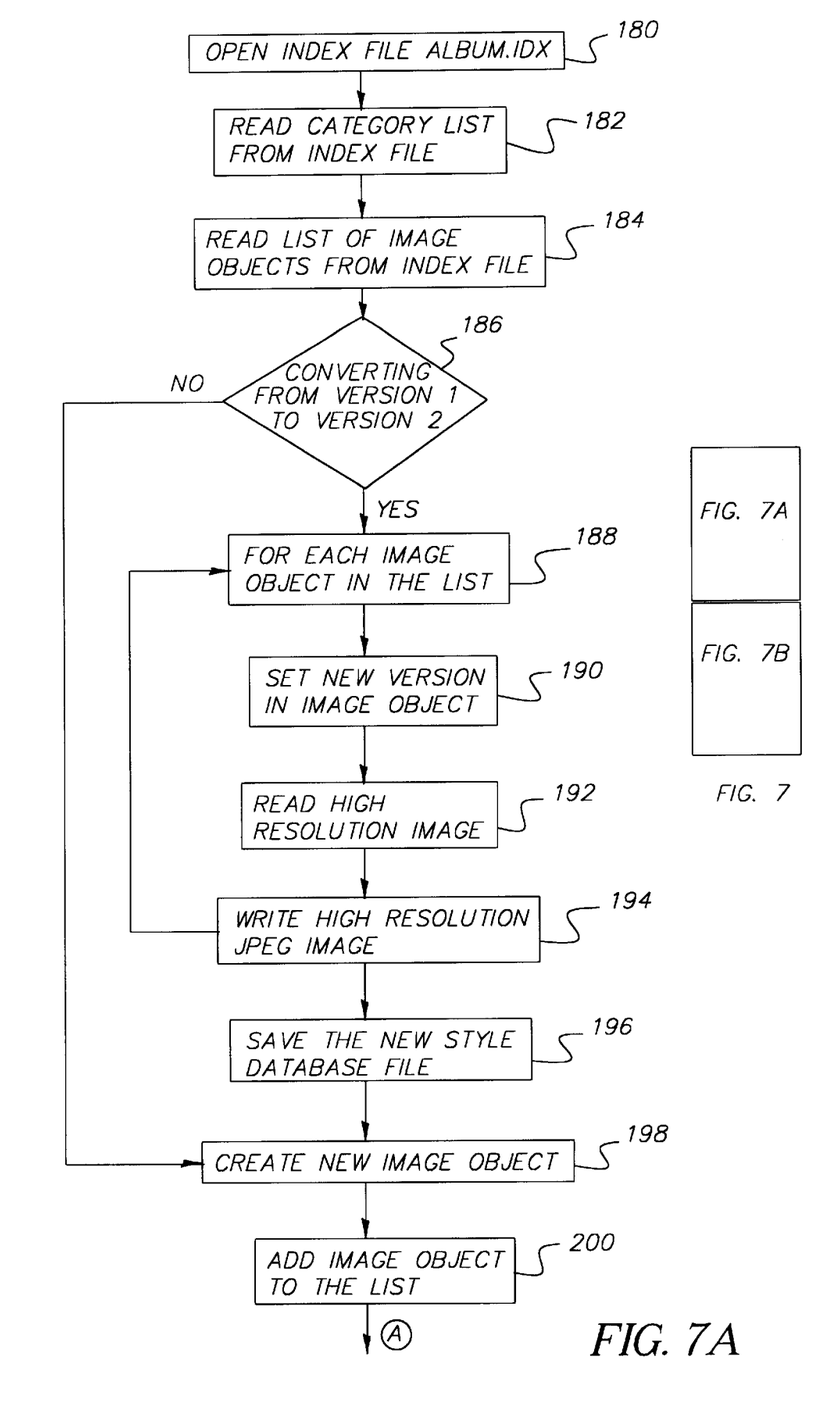
Figure 7B:
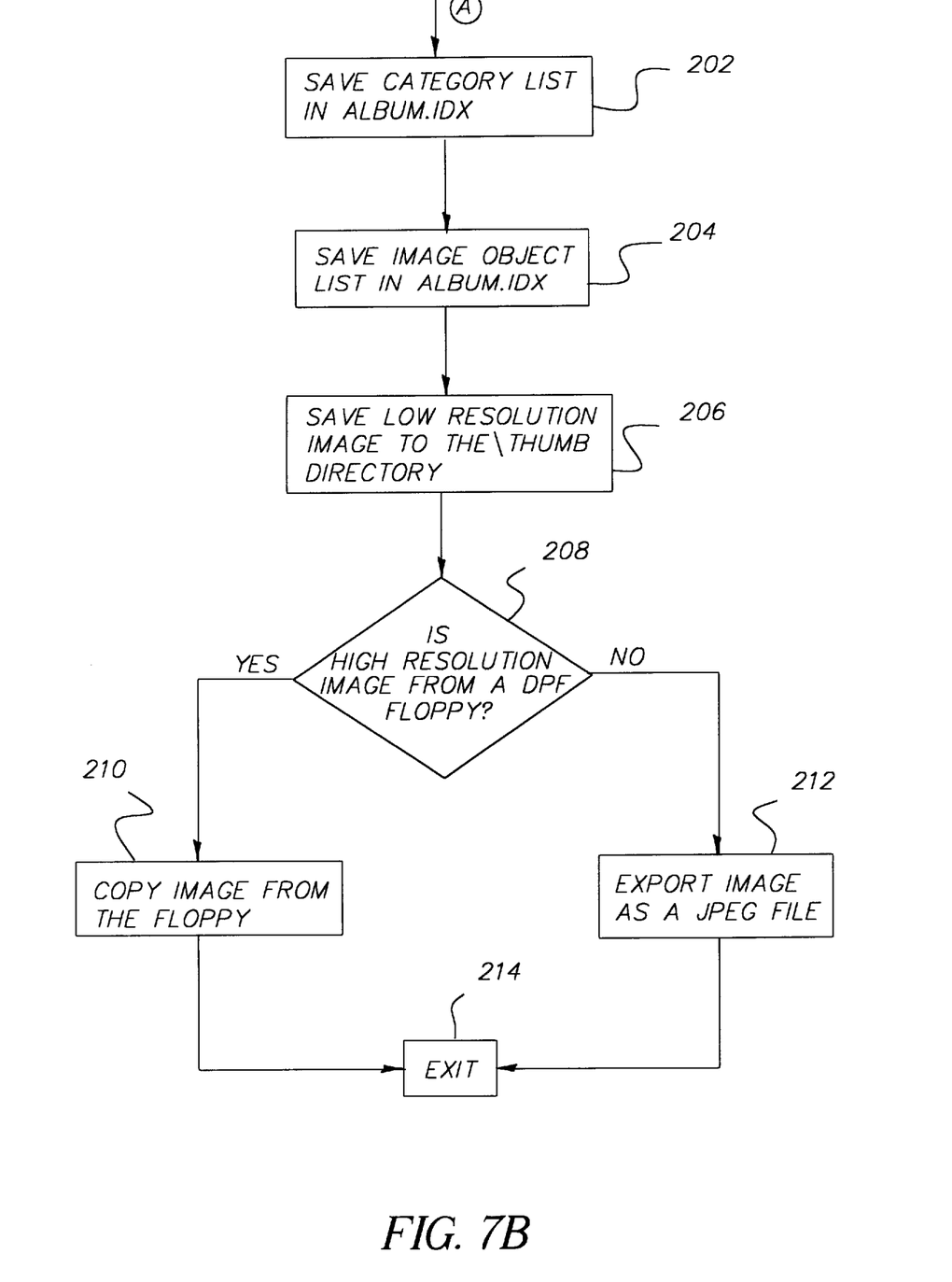

When viewing the Images View screen of FIG. 2, the user can select one or more images and click on the "Save in folder" command in the File menu. The application program then executes the routing outlined in the flowchart of FIGS. 7A and 7B according to the following steps: Open the file "Album.IDX" 180. Create a new in memory category list 182 from the index file. Create 184 a new in memory image object list from the index file. If the thumbnail and higher resolution images were saved as uncompressed images (Version 1), then they are converted to JPEG compressed images according to steps 188–196 in FIG. 7. Then, for each selected image, create a new image object 198 and add it to the image object list 200. Write out the new category list. Write out the new image object list. Save the category list and image object list 202, 204 in the index file Album.IDX. Save the thumbnail to the \THUMB directory 206. The high resolution images are then saved to the \IMAGES directory by either of two methods. Namely, if the Image is from the floppy 208, copy the JPEG from the floppy 210. Otherwise, export the file as a JPEG file 212. The routine is then exited 214.

Editing Picture

Figures 8, 8B:
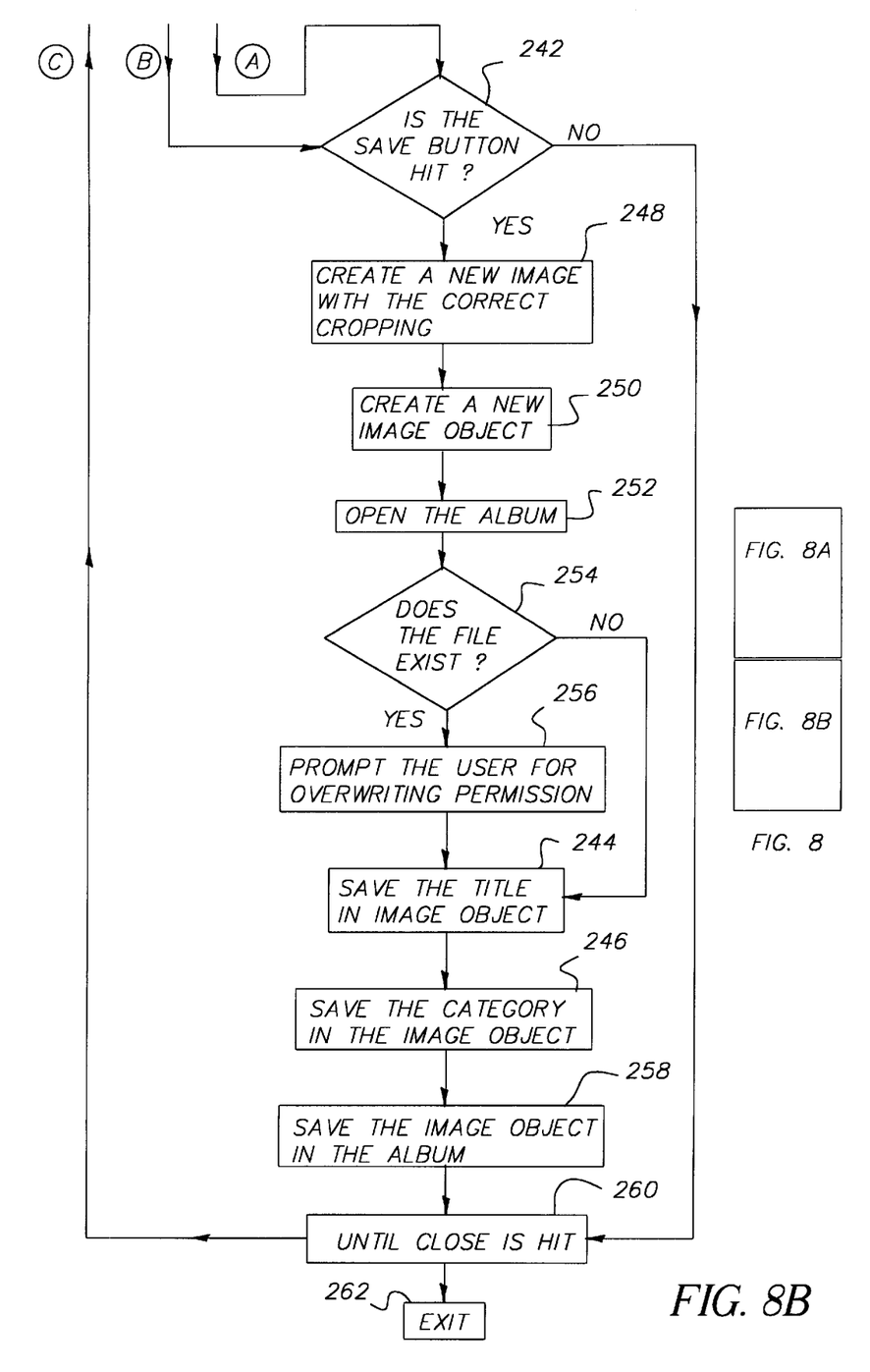
Figure 8A:
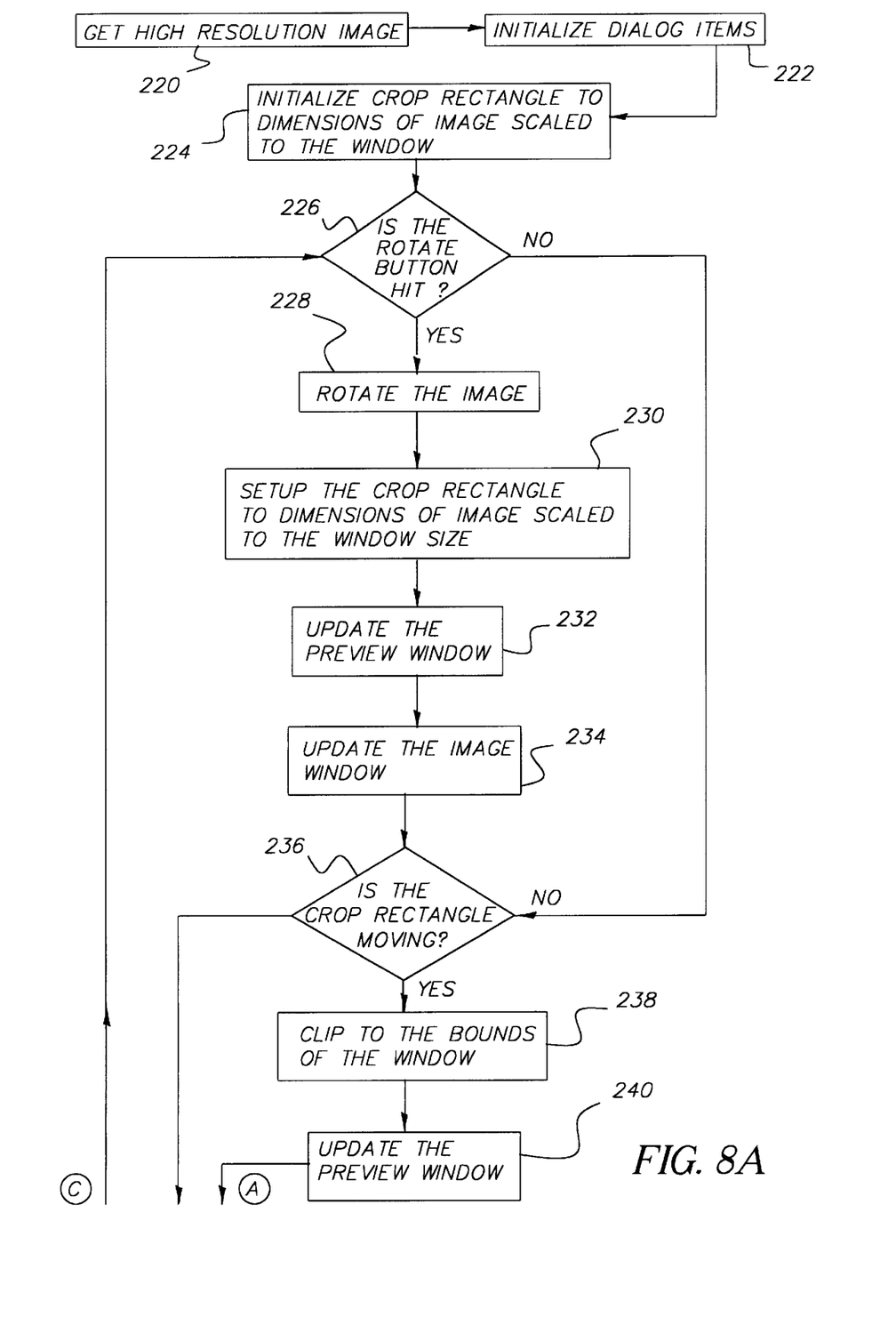

The Image Edit View screen of FIG. 3 allows a user to access the crop, rotate and save images to the Clipboard feature of the application program. When the "Edit Picture" command is selected from the Images View of FIG. 2, the Image Edit View window of FIG. 3 is displayed. The process executed by the edit feature is shown in FIGS. 8A and 8B. An image must be selected for the "Edit Picture" command to be enabled. First, initialization of the window is performed as follows: Retrieve the high resolution data of the selected image 220. Initialize 220 dialog items including the categories combo box. Set up the crop rectangle to the dimensions of the image scaled to the edit window 224. Initialize the title edit field.

To rotate a picture, click on one of the rotate buttons or select a rotate command from the Edit menu. If a rotate command has been given 226, then Accusoft IMG_rotate_ bitmap sub-routine is called to rotate the image 228. Set up a crop rectangle 40 in FIG. 3, to the dimensions of the image window 230, sized to the aspect ratio of the image. Update 232 the preview window. Update 234 the preview window 42.

To crop an image, click and drag a displayed arrow cursor to resize the crop rectangle 40. The following steps are then executed by the application program: Track the crop rectangle 236 while clipping 238 to the bounds of the window available. When the user releases the mouse button, update 240 the preview window 42 of FIG. 3. The user can save the image edit changes by clicking the Save button. If the "Save" button is hit by the user 242, a new image is created 248 with the correct cropping coordinates. A new image object is then created 250 automatically (that is, without further user input or user image manipulation being required). The new image object, of course, contains a new thumbnail image corresponding to the new high resolution image. Further steps executed are as follows: Open the album 252. Ensure that a different picture with the same title doesn't exist 254. If it does, prompt the user 256 for permission to overwrite the image. Save the title and category in the image object 244, 246. The image object is then saved 258 to the album. The subroutine is repeated until "Close" is hit 260, at which time it is exited 262.

Copy to Clipboard

To copy a picture to the clipboard, choose the Copy command from the Edit menu. If the image is 8 bits or less or the display is 256 colors, send the clipboard the universal palette date. Send the clipboard the device independent data. If the image is greater than 8 bits or the display is greater than 256 colors, send the image the device dependent data.

Printing an Index from

The group of thumbnails displayed in the Images View screen of FIG. 2 can be printed by selecting the Print Thumbnails command from the File menu. When this is selected, the applications program proceeds through the following steps: Retrieve the printer metrics (the dpi and size of paper) 150 from the printer driver. Set the gap 152 between thumbnail frames to 0.1". Set the frame dimensions 154 of the thumbnail to 1.5"×1.5". Compute the maximum number of rows and columns per page 156. Loop through the following sequence for each selected image 158. Draw the outline of the thumb 160. Print the image title 162. Print the image timestamp 164 associated with the image. Retrieve the high resolution image 166. Determine how much high resolution data is needed to fill the thumbnail from the page 168. Print the thumbnail 170 then exit the routine 172.

A detailed listing of the application programs is included in Appendix A.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | Scanner |
| 12 | Spliced Roll of Film |
| 14 | Computer |
| 16 | Index Printer |
| 18 | Index Print |
| 20 | Index Images |
| 21 | Computer Memory |
| 22 | Floppy Disc Writer and label Printer |
| 24 | Floppy Disc |
| 26 | Floppy Disc Label |
| 28 | Floppy Disc Label with Index Print |
| 38 | Thumbnail Images |
| 40 | Crop Rectangle |
| 42 | Preview Window |
| 100–262 | Steps |

What is claimed is:

1. A floppy disc index imaging system comprising:

a) a scanner for scanning a plurality of photographic images to produce a corresponding plurality of digital images;

b) a computer connected to the scanner for receiving the digital images and generating a corresponding plurality of thumbnail digital images and containing index imaging software for writing an application program for manipulating the digital images;

c) a categorization routine that stores a categorization file for thumbnail images on the disc, the categorization routine storing higher resolution digital images and applying a routine that categorizes the thumbnail images within a separate file;

d) an application routine that applies the categorization routine to thumbnail images within the separate file, application generating an index display from digital image data on the storage medium and finally a reconstruction of the thumbnail images with at least one of the categorizations applied from the separate file;

e) a printer connected to the computer for producing an index print of the digital images in accordance with the categorization routine as applied by the application routine; and f) a floppy disc writer connected to the computer for recording the thumbnail digital images and the application program on a floppy disc.

2. The floppy disc index imaging system claimed in claim 1, wherein the application program contains means for producing an index print of the thumbnail images.

3. The floppy disc index imaging system claimed in claim 1, wherein the computer generates a corresponding plurality of higher resolution images from the digital images, and wherein the floppy disc writer stores the higher resolution images on the floppy disc.

4. The floppy disc index imaging system claimed in claim 3, wherein the application program includes means for zooming and cropping the higher resolution images.

5. The floppy disc index imaging system claimed in claim 3, wherein the application program includes means for printing the higher resolution images.

6. The floppy disc index imaging system claimed in claim 3, wherein the application program includes means for exporting the higher resolution images to a clipboard.

7. The floppy disc index imaging system claimed in claim 3, wherein the application program includes means for converting the higher resolution images to a plurality of image file formats.

8. The floppy disc index imaging system claimed in claim 3, wherein the application program includes means for sequentially displaying the higher resolution images on a computer display.

9. The floppy disc index imaging system claimed in claim 3, wherein the application program includes means for assigning the higher resolution images to categories and saving the higher resolution images on a hard drive organized according to the categories.

10. A computer program product comprising: a computer readable storage medium comprising:

a plurality thumbnail digital images corresponding to the set of higher resolution digital images;

a routine that applies at least categorization to the thumbnail images within a separate file, the categorization routine storing higher resolution digital images and applying a routine that categorizes the thumbnail images within a separate file; and application program means when programmed into a computer for generating an index display from digital image data on the storage medium, that is a reconstruction of the thumbnail images with at least one of the categorizations applied from the separate file, the application program means generating an index display from digital image data on the storage medium and finally a reconstruction of the thumbnail images with at least one of the categorizations applied from the separate file.

11. A computer program product according to claim 10 wherein the machine readable storage medium also contains higher resolution digital images corresponding to the thumbnail digital images, and wherein the application program means further includes means for allowing a user to manipulate the higher resolution digital images and for generating corresponding thumbnail digital images in accordance with the manipulation.

12. A computer program product according to claim 10 wherein the application program means further includes means for allowing a user to manipulate the thumbnail digital images and which generates a file containing data on the manipulation, which file is associated with the thumbnail digital images.

13. A computer program product according to claim 12 wherein the manipulation is rotation of the thumbnail digital image.

14. A computer program product according to claim 10 wherein the machine readable storage medium also contains higher resolution digital images corresponding to the thumbnail digital images and crop or orientation indications associated with respective higher resolution images, and wherein the application program means further includes means for displaying the higher resolution digital images in accordance with the crop or orientation indication.

15. A computer program product according to claim 11 wherein the machine readable storage medium also contains crop or orientation indications associated with respective higher resolution images, and wherein the application program means further includes means for displaying the higher resolution digital images in accordance with the crop or orientation indication.

16. The computer program product claimed in claim 10, wherein the thumbnail digital images are less than 100×100 pixels and wherein the storage medium further contains higher resolution images corresponding to the thumbnail images.

17. The computer program product claimed in claim 16, wherein the application program further includes means for zooming and cropping the higher resolution images.

18. The computer program product claimed in claim 16, wherein the application program further includes means for printing the higher resolution images.

19. The computer program product claimed in claim 16, wherein the application program further includes means for exporting the higher resolution images to a clipboard.

20. The computer program product claimed in claim 16, wherein the application program further includes means for converting the higher resolution to a plurality of image file formats.

21. The computer program product claimed in claim 10, further comprising a label having an index print of the thumbnail digital images on the label.

22. The computer program product claimed in claim 16, wherein the application program further includes means for sequentially displaying the higher resolution images on a computer display.

23. The computer program product claimed in claim 16, wherein the application program further includes means for assigning the higher resolution images to categories and saving the higher resolution images on a hard drive organized according to the categories.

* * * * *